United States Patent [19]

Ullrich et al.

[11] Patent Number: 5,155,248
[45] Date of Patent: Oct. 13, 1992

[54] POLYURETHANE CATALYSTS

[75] Inventors: Volker Ullrich, Schriesheim; Clemens Schudok, Hemsbach, both of Fed. Rep. of Germany

[73] Assignee: Rhein Chemie Rheinau GmbH, Mannheim, Fed. Rep. of Germany

[21] Appl. No.: 800,048

[22] Filed: Nov. 29, 1991

[30] Foreign Application Priority Data

Dec. 11, 1990 [DE] Fed. Rep. of Germany ....... 4039448

[51] Int. Cl.$^5$ .............................................. C07F 7/22
[52] U.S. Cl. ...................................... 556/90; 556/81; 556/87; 556/88; 556/89; 556/94; 556/106; 556/107; 528/45; 528/58; 521/117; 521/126
[58] Field of Search ....................... 556/90, 81, 87, 88, 556/89, 94, 106, 107; 528/45, 58; 521/117, 126

[56] References Cited

U.S. PATENT DOCUMENTS

| | | | |
|---|---|---|---|
| 3,922,253 | 12/1975 | Jerabek et al. | 528/45 |
| 4,028,313 | 6/1977 | Mueller et al. | 528/45 |
| 4,322,519 | 3/1982 | Suenobu et al. | 556/90 X |
| 4,816,593 | 3/1989 | Modi et al. | 556/89 |
| 4,987,244 | 1/1991 | Nichols et al. | 556/90 |
| 5,089,645 | 2/1992 | Nichols et al. | 556/90 |

Primary Examiner—Arthur C. Prescott
Attorney, Agent, or Firm—Connolly & Hutz

[57] ABSTRACT

Reaction products of dibutyl tin oxide with selected aromatic aminocarboxylic acids, a process for their preparation and their use as catalysts for the preparation of polyurethanes.

3 Claims, No Drawings

POLYURETHANE CATALYSTS

This invention relates to the preparation of solid and foamed polyurethanes.

Various classes of substances are known as catalysts for activating the reaction of isocyanates with polyols and/or the reaction of isocyanates with water in the preparation of polyurethanes (PUR) by the polyaddition process, e.g. amines (cyclic, acyclic; monoamines, diamines, oligomers having one or more amino groups) and organometallic compounds, especially those of tin, iron, bismuth and mercury (see Kunststoff-Handbuch, volume 7, pp. 92-99, publishers Karl-Hanser Verlag, Munich (1983)).

The catalysts used are in most cases not single compounds but mixtures of several components in order to enable the required properties and the reaction parameters necessary for obtaining them to be adjusted (see Z. Polymerforsch. 28 (1977), 405). This is necessary for the industrial production of PUR as this demands certain parameters which can only be realised with certain particular mixtures of different catalysts.

Most amine catalysts have a strong odour and migrate from the PUR. Their use is therefore limited (see DE-OS 2 523 633).

This invention relates to migration resistant and odourless catalysts for the preparation of polyurethanes and to a process for their preparation.

The catalysts according to the invention are products of reaction of dibutyl tin oxide with aromatic aminocarboxylic acids corresponding to the following formula

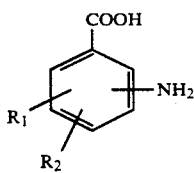

(I)

wherein
$R_1$ and $R_2$ denote, independently of one another, —OH, Cl, —$NH_2$ or —$(CH_2)_n$—$CH_3$ (n=1–6) and $R_2$ in addition denotes H in the molar ratio of 1:2.

The following are preferred compounds corresponding to formula (I):

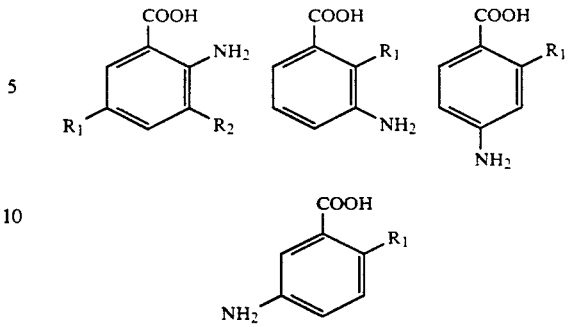

wherein
$R_1$ and $R_2$=OH, Cl, $NH_2$ and $(CH_2)_n$—$CH_3$ (n=1–6) and $R_2$ in addition denotes H.

The reaction products are crystalline and odourless and form clear solutions in polyether polyols, polyester polyols and the usual glycols such as ethylene glycol and dipropylene glycol.

The preparation of the catalysts may be described by the following general reaction equation:

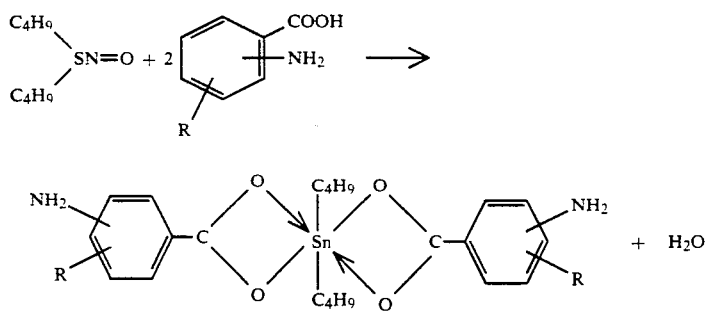

Dibutyl tin oxide is reacted with 2–3 mol, preferably 2–2.5 mol, of the appropriate aminocarboxylic acid in an inert solvent. The water formed in the reaction resulting in the corresponding tin dicarboxylate is distilled off azeotropically. The following amincarboxylic acids are used: 3,5-diaminobenzoic acid; 4-amino-2-hydroxybenzoic acid; 2-amino-3-hydroxybenzoic acid; 2-aminobenzoic acid; 3-aminobenzoic acid; 4-aminobenzoic acid; 3-amino-2hydroxybenzoic acid; 5-amino-2-hydroxybenzoic acid, 2-amino-4-hydroxybenzoic acid; 2-amino-5-hydroxybenzoic acid; 3,4-diaminobenzoic acid; 4-amino-3-methylbenzoic acid; 2-amino-6-methylbenzoic acid; 2-amino-3-methylbenzoic acid; 2-amino-5-methyl-benzoic acid; 2-amino-5-chlorobenzoic acid, 3-amino-4-chlorobenzoic acid, 4-amino-2-chlorobenzoic acid, 5-amino-2-chlorobenzoic acid, 2-amino-3-octyl-benzoic acid, 2-amino-3-hexyl-benzoic acid.

Dibutyl tin oxide is reacted solvent free with about 2 mol of the appropriate aromatic aminocarboxylic acid to form the corresponding tin dicarboxylate with concomitant removal of water by azeotropic distillation.

In contrast to the tin compounds hitherto used for PUR preparation, such as dibutyl tin dilaurate and dibutyl tin diacetate, these catalysts are not subject to hydrolysis. Polyol formulations, which may contain water, catalysts and optionally stabilisers, pigments, flame retardants or other fillers, are stable in storage in the presence of the above-described catalysts without loss of their reactivity.

The catalysts may be used in a quantity of from 0.01 to 1% by weight, in particular from 0.1 to 0.6% by weight, based on the polyol.

EXAMPLES

A. Preparation of the catalysts

Example 1

Preparation of tin-di-n-butyl-di-(3,5-amino)-benzoate 232.6 g of 3,5-diaminobenzoic acid (1.53 mol) and 190.3 g of dibutyl tin oxide (,0.765 mol) are heated under reflux in 800 ml of cyclohexane, using a water separator. After removal of the water of reaction, the reaction mixture is left to cool and the product is left to crystallise. The reaction mixture is then filtered and the crystals are recrystallied from ethanol. A white, crystalline powder is obtained.

The yield is 374 g=91% of theoretical.
Melting point: 166° C.
Analysis: C=48.4% (theoretical: 49.1%). H=5.4% (theoretical: 5.95%). N=10.7% (theoretical: 10.41%).

Example 2

Preparation of tin-di-n-butyl-di-(4-amino-2-hydroxy)benzoate 274 g of 4-amino-2-hydro-benzoic acid (1,53 mol) and 190.3 g of dibutyl tin oxide (0.765 mol) are heated under reflux in 100 ml of xylene, using a water separator. When all the water of reaction has been removed, the reaction mixture is left to cool so that the product crystallises. The product is separated by suction filtration, recrystallied from methanol and dried under vacuum. A pale yellow, crystalline product melting at 120°–126° C. is obtained.

The yield is 392 g=95.5% of theoretical.
Analysis: C=47.5% (theoretical: 49.2%). H=6.05% (theoretical: 5.59%). N=5.03% (theoretical: 5.22%).

B. Examples of practical application

Example 3

Preparation of a PUR Elastomer

| Formulation: | | |
|---|---|---|
| Polyol: | 43 parts | ⎫ |
| Filler: | 56.5 parts | ⎬ Component A |
| Catalyst: | 0.5 parts | ⎭ |
| Isocyanate: | 45 parts | = Component B |

The components, polyol, filler and catalyst, are homogeneously mixed at 20° C.

To determine the activity of a catalyst, the time required for complete hardening of the PUR system (pot life) in a homogeneous mixture of component A and component B is measured.

The storage stability of a catalyst is tested by storing component A containing the catalyst in a closed container at 60° C. and determining the change in pot life during the storage time.

When dibutyl tin dilaurate was used, the pot life was found to increase from 2 min. to more than 10 min. after 30 days. When tin-di-n-butyl-di-(3-amino)-benzoate was used, the pot life remained unchanged at 2 minutes even after 90 days' storage.

Dibutyl tin dilaurate substantially decomposed within 30 days whereas tin-di-n-butyl-di-(3-amino)-benzoate did not decompose (no decomposition products could be detected). The catalytic activity is therefore fully preserved even after the long storage time.

Example 4

Preparation of a PUR rigid foam

| Formulation | | |
|---|---|---|
| Polyol: | 95.5 parts | ⎫ |
| Filler: | 3.5 parts | ⎬ Component A |
| Catalyst: | 1.0 part | ⎭ |
| Isocyanate: | 160 parts | = Component B |

The polyol, water and catalyst are homogeneously mixed at 20° C.

The catalytic activity of the activator is determined by measuring the time required for complete hardening of the PUR foam system (tack-free time) in a homogeneous mixture of components A and B. The hydrolytic stability of an activator is tested by storing component A containing the catalyst in a closed container at 25° C. and measuring the increase in tack-free time at certain intervals.

When dibutyl tin diacetate was used, the catalytic activity was zero after only 10 days' storage, due to hydrolysis.

When tin-di-n-butyl-di-(3,5-diamino)-benzoate was used according to the invention, the reactivity remained unchanged after storage of component A for 60 days at 25° C. No decomposition products of the catalyst could be demonstrated.

We claim:

1. Reaction products of 1 mol of dibutyl tin oxide and 2 mol of an aromatic aminocarboxylic acid corresponding to the following formula

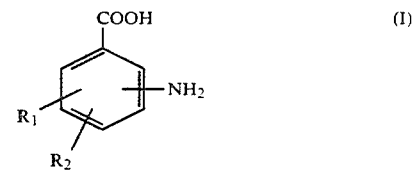

(I)

wherein
$R_1$ and $R_2$ denote, independently of one another, —OH; Cl, —NH$_2$, or —(CH$_2$)$_n$—CH$_3$ (n = 1–6) and $R_2$ in addition denotes H.

2. A process of preparing a polyurethane from a polyol and isocyanates consisting essentially of carrying out the reaction in the presence of a catalytically effective amount of the reaction product of claim 1.

3. A process for the preparation of the reaction products according to claim 1, characterised in that 2 mol of an aminocarboxylic acid corresponding to formula (I) are reacted with 1 mol of dibutyl tin oxide with azeotropic distillation of the water formed.

* * * * *